(12) United States Patent
Bui et al.

(10) Patent No.: US 11,741,751 B2
(45) Date of Patent: Aug. 29, 2023

(54) MASKED FACE RECOGNITION METHOD

(71) Applicant: Vinai Artificial Intelligence Application and Research Joint Stock Company, Ha Noi (VN)

(72) Inventors: Hung Hai Bui, Ha Noi (VN); Toan Duc Bui, Ha Noi (VN); Anh Hoang Pham, Ha Noi (VN)

(73) Assignee: Vinai AI Application and Research Joint Stock Co., Ha Noi (VN)

( * ) Notice: Subject to any disclaimer, the term of this patent is extended or adjusted under 35 U.S.C. 154(b) by 303 days.

(21) Appl. No.: 17/230,413

(22) Filed: Apr. 14, 2021

(65) Prior Publication Data

US 2022/0108101 A1 Apr. 7, 2022

(30) Foreign Application Priority Data

Oct. 1, 2020 (VN) .............................. 1-2020-05642

(51) Int. Cl.
*G06N 3/08* (2023.01)
*G06F 18/214* (2023.01)
*G06V 40/16* (2022.01)

(52) U.S. Cl.
CPC ........ *G06V 40/171* (2022.01); *G06F 18/2155* (2023.01); *G06N 3/08* (2013.01); *G06V 40/173* (2022.01)

(58) Field of Classification Search
None
See application file for complete search history.

(56) References Cited

U.S. PATENT DOCUMENTS

| | | | |
|---|---|---|---|
| 8,620,091 B2 | 12/2013 | Choi | |
| 10,438,329 B2 | 10/2019 | Tan et al. | |
| 2022/0067432 A1* | 3/2022 | Chen | ..................... G06V 10/764 |
| 2023/0080031 A1* | 3/2023 | Zhang | .................. G06V 40/171 |

* cited by examiner

*Primary Examiner* — Idowu O Osifade
(74) *Attorney, Agent, or Firm* — United One Law Group LLC; Kongsik Kim; Jhongwoo Peck

(57) ABSTRACT

Provided is a face recognition method comprising acquiring a masked face image including a masked region and an un-masked region; obtaining an image feature from the masked face image; inputting the image feature to a pre-trained segmentation model to automatically estimate a feature of the masked region; and refining the image feature using the estimated feature of the masked region, wherein the refining step comprising focusing on a feature of the un-masked region and discarding the estimated feature of the masked region.

7 Claims, 7 Drawing Sheets

MASKED FACE RECOGNITION METHOD

CROSS-REFERENCE TO RELATED APPLICATION

This application claims priority to Vietnamese Application No. 1-2020-05642 filed on Oct. 1, 2020, which application is incorporated herein by reference in its entirety.

TECHNICAL FIELD

The present invention relates to a masked face recognition apparatus and method.

RELATED ART

Despite substantial research that has gone into computational face matching algorithms, it is still difficult to develop face recognition algorithms to deploy robustly in unconstrained settings, especially facial occlusions.

Face recognition plays an important role in many real-world applications such as surveillance camera systems, subject verification, or criminal identification. Thanks to the success of deep convolutional neural networks (DCNNs), face recognition has achieved significant performance in practice.

However, most current DCNN-based face recognition methods treat all input pixels, that is, both facial and occluded regions, equally. Therefore, the performance accuracy dramatically drops when dealing with masked faces. This is because masked faces have incomplete visual parts and insufficient identity information signals. Accordingly, it is difficult for face recognition systems to achieve high accuracy.

SUMMARY

The present invention is directed to providing a masked face recognition apparatus and method which have a simple approach to meeting some of the goals of robust subject identification in real-world situations and solving the problem of masked face recognition.

The present invention is also directed to providing a masked face recognition apparatus and method which provide an automatic mechanism to distinguish facial and masked regions separately unlike existing methods in which all input pixels, that is, both facial and occluded regions, in an aligned face of a subject are taken into consideration.

The present invention is also directed to providing a masked face recognition apparatus and method which perform guided gating convolution to force a network to learn facial regions and discard masked regions.

The present invention is also directed to providing a masked face recognition apparatus and method which are based on a non-masked face recognition architecture.

The present invention is also directed to providing a masked face recognition apparatus and method which employ a new deep learning network.

The present invention is also directed to providing a masked face recognition apparatus and method in which a new network architecture based on induced or guided gating convolution is provided for masked face recognition.

Objectives to be achieved by embodiments of the present invention are not limited thereto, and the present invention may also include objectives or effects which can be derived from solutions or embodiments described below.

According to an aspect of the present invention, there is provided a face recognition method comprising acquiring a masked face image including a masked region and an un-masked region; obtaining an image feature from the masked face image; inputting the image feature to a pre-trained segmentation model to automatically estimate a feature of the masked region; and refining the image feature using the estimated feature of the masked region, wherein the refining step comprising focusing on a feature of the un-masked region and discarding the estimated feature of the masked region.

The segmentation model may be trained by using a masked label and a masked feature as the inputs and learning a softmax score to classify a region as a masked region if the softmax score indicates a high value and classify a region as an un-masked region if the softmax score indicates a low value.

The face recognition method may further comprise minimizing the cross entropy loss function between an estimated feature of the masked region and the masked label.

The masked face image may be selected from a group comprises a masked face image and a non-masked face image.

The face recognition method may be based on a deep convolutional neural network and the face recognition method may be performed on a plurality of layers of the deep convolutional neural network.

The image feature may be down-sampled from the coarsest stage to finest stage on the plurality of layers.

The masked label may be down-sampled.

According to another aspect of the present invention, there is provided a computer readable medium configured to store a program for executing a face recognition method. The face recognition method comprises acquiring a masked face image including a masked region and an un-masked region; obtaining an image feature from the masked face image; inputting the image feature to a pre-trained segmentation model to automatically estimate a feature of the masked region; and refining the image feature using the estimated feature of the masked region, wherein the refining step comprising focusing on a feature of the un-masked region and discarding the estimated feature of the masked region.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
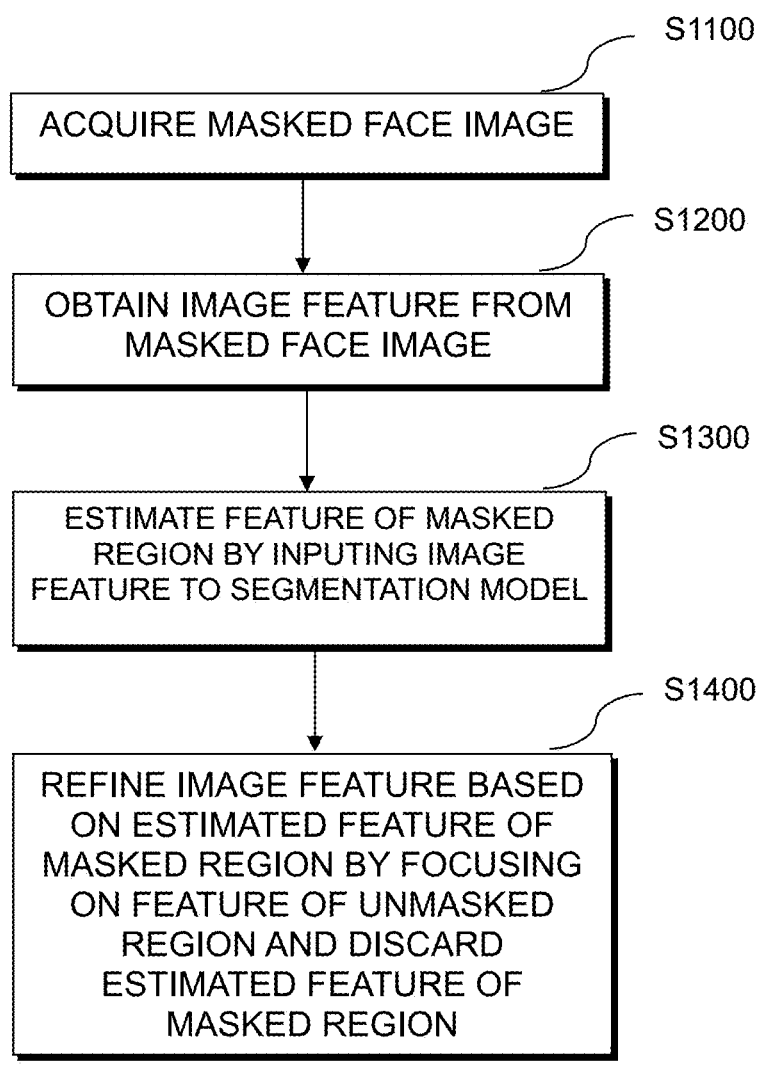
FIG. 1 is a flowchart illustrating a face recognition method according to an exemplary embodiment of the present invention.

Although a variety of modifications and several embodiments of the present invention may be made, exemplary embodiments will be shown in the accompanying drawings and described. However, it should be understood that the present invention is not limited to the exemplary embodiments and includes all changes, equivalents, or substitutions within the spirit and technical scope of the present invention.

The terms including ordinal numbers, such as second and first, may be used for describing a variety of elements, but the elements are not limited by the terms. The terms are used only for distinguishing one element from another element. For example, without departing from the scope of the present invention, a second element may be referred to as a first element, and similarly, a first element may be referred to as a second element. The term "and/or" includes any combination of a plurality of associated listed items or any one of the plurality of associated listed items.

When it is stated that one element is "connected" or "joined" to another element, it should be understood that the element may be directly connected or joined to the other element but another element may be present therebetween. On the other hand, when it is stated that one element is "directly connected" or "directly joined" to another element, it should be understood that no other element is present therebetween.

Terms used herein are used only for describing exemplary embodiments and are not intended to limit the present invention. Singular expressions include plural expressions unless clearly defined otherwise in context. Throughout this specification, it should be understood that the terms "include," "have," etc. are used herein to specify the presence of stated features, numbers, steps, operations, elements, parts, or combinations thereof but do not preclude the presence or addition of one or more other features, numbers, steps, operations, elements, parts, or combinations thereof.

Unless otherwise defined, terms used herein including technical or scientific terms have the same meanings as terms which are generally understood by those of ordinary skill in the art. Terms such as those defined in commonly used dictionaries should be construed as having meanings consistent with contextual meanings of related art and should not be interpreted in an idealized or excessively formal sense unless clearly defined so herein.

Hereinafter, embodiments of the present invention will be described in detail with reference to the accompanying drawings. Throughout the drawings, like reference numerals will be given to the same or corresponding elements, and a repeated description thereof will be omitted.

Figure 2:
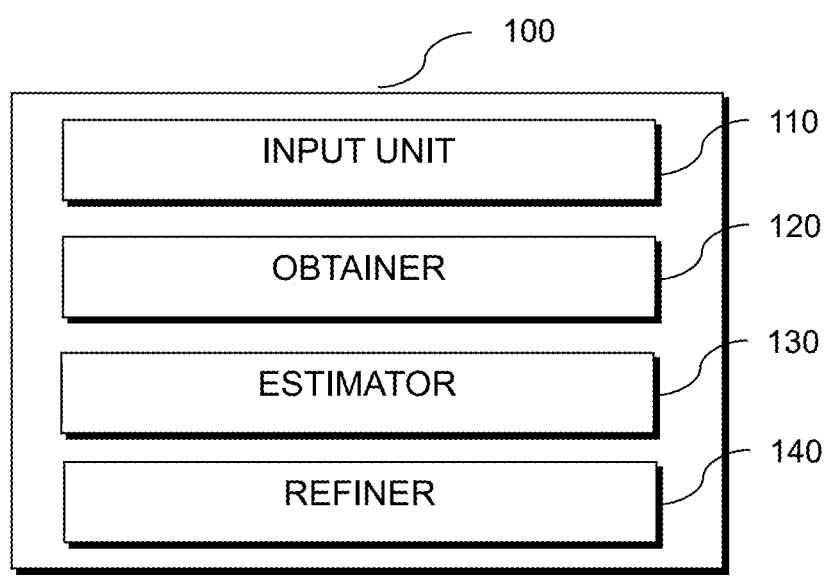
FIG. 2 is a block diagram of a face recognition apparatus according to an exemplary embodiment of the present invention.

FIG. 1 is a flowchart illustrating a face recognition method according to an exemplary embodiment of the present invention, and FIG. 2 is a block diagram of a face recognition apparatus according to an exemplary embodiment of the present invention.

Referring to FIG. 1, the face recognition method according to the exemplary embodiment of the present invention includes an operation S1100 of acquiring a masked face image, an operation S1200 of obtaining an image feature from the masked face image, an operation S1300 of inputting the image feature to a pre-trained segmentation model to automatically estimate a feature of the masked region, an operation S1400 of refining the image feature using the estimated feature of the masked region by focusing on a feature of the un-masked region and discarding the estimated feature of the masked region.

Further, according to an embodiment, the segmentation model is trained by using a masked label and a masked feature as the inputs and learning a softmax score to classify a region as a masked region if the softmax score indicates a high value and classify a region as an un-masked region if the softmax score indicates a low value.

According to the embodiment, the face recognition method may further comprise minimizing a cross entropy loss function between an estimated feature of the masked region and the masked label.

Further, the masked face image may be selected from a group comprises a masked face image and a non-masked face image.

The face recognition method according to the exemplary embodiment of the present invention may be based on a deep convolutional neural network and the face recognition method may be performed on a plurality of layers of the deep convolutional neural network.

The image feature may be down-sampled from the coarsest stage to finest stage on the plurality of layers.

The masked label may also be down-sampled.

According to other embodiment, a computer readable medium is provided that may be configured to store a program for executing the face recognition method as described above.

Referring to FIG. 2, a face recognition apparatus 100 according to the exemplary embodiment of the present invention may include an input unit 110, an obtainer 120, a estimator 130, and a refiner 140.

The input unit 110 may input a masked face image. The masked face image may comprise a masked region and an un-masked region. Then, the obtainer 120 may obtain an image feature from the masked face image. The estimator 130 may automatically estimate a feature of the masked region by inputting the image feature to a pre-trained segmentation model. The estimator 130 executes the contents of segmentation (referred to as a segmentation node, network, model, etc.).

The estimator 130 and the refiner 140 execute the content of a convolution and architecture and the content of a jointly training recognition and segmentation branch (or node), which will be described below.

Detailed operations used in the face recognition method and apparatus according to the exemplary embodiments of the present invention will be described below.

Figure 3:
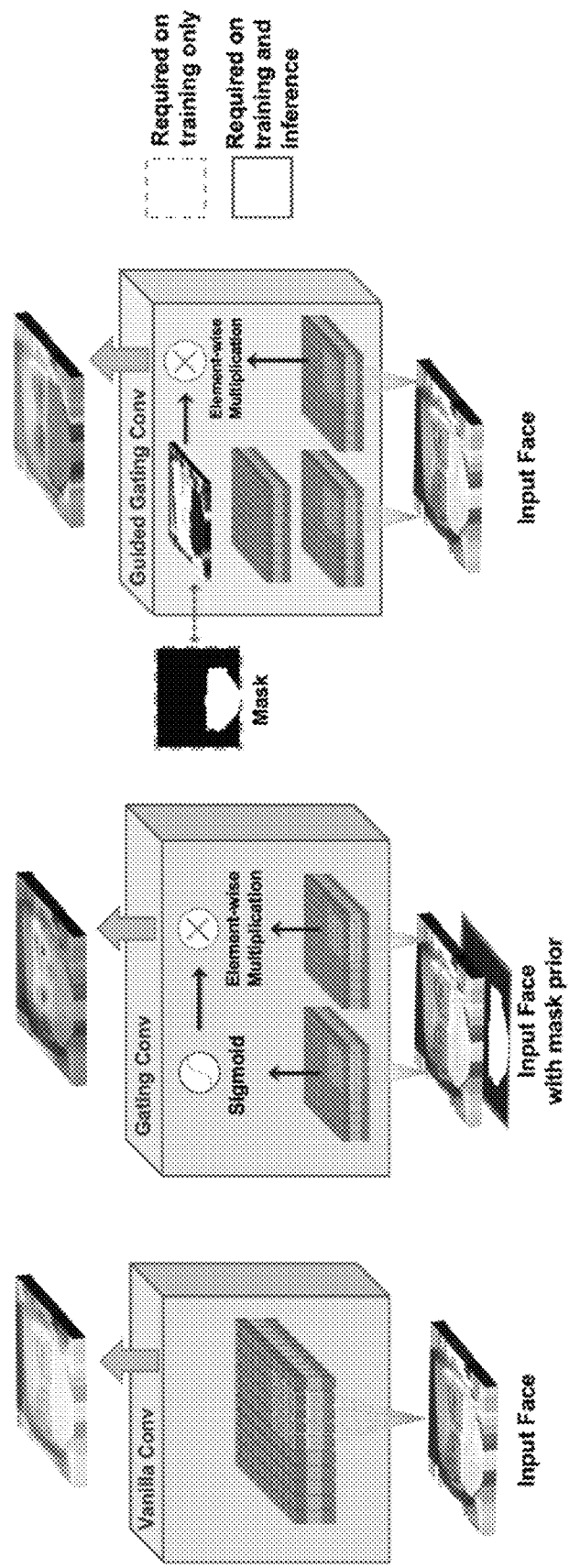
FIG. 3 is a diagram showing comparison among vanilla convolution, gate convolution, and guided gating convolution.
Figure 4:
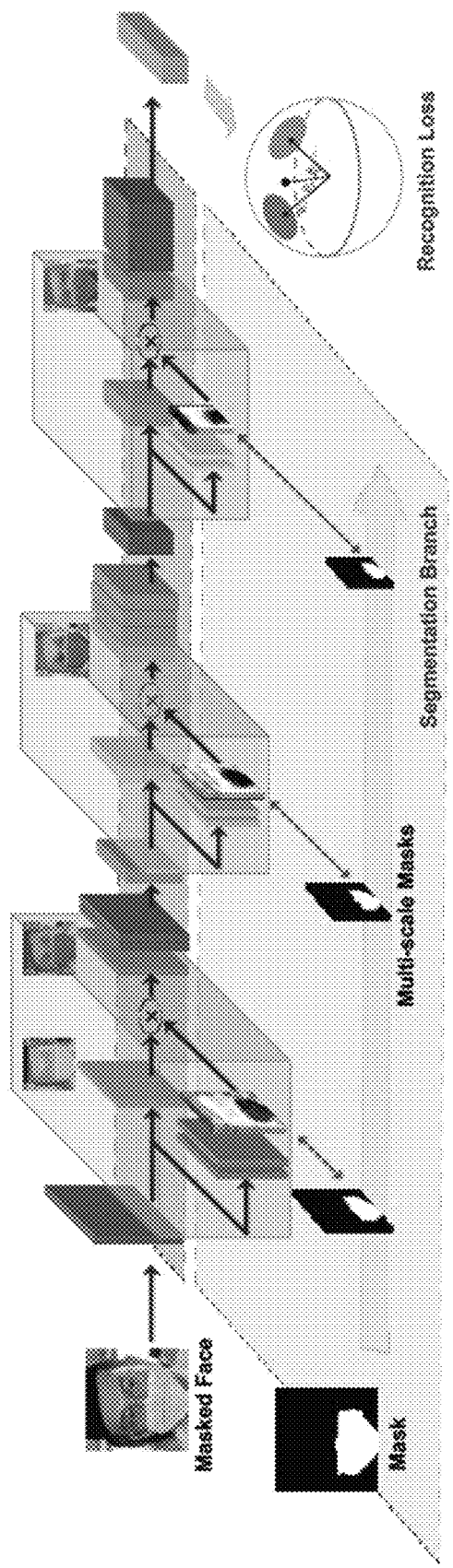
FIG. 4 is a diagram showing an architecture for masked face recognition.
Figure 5:
FIG. 5 shows a synthetic masked dataset.
Figure 6A:
FIGS. 6A-6C show a given image, masked and non-masked regions equally contributed in vanilla convolution, and contributions adaptively adjusted in guided gating convolution, respectively.
Figure 6B:
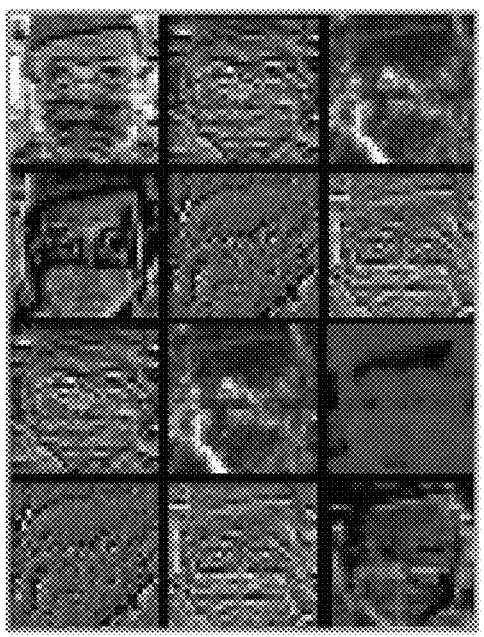
Figure 6C:
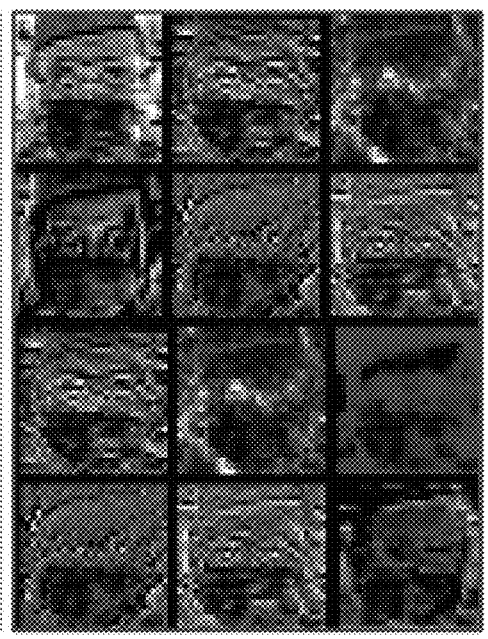
Figure 7:
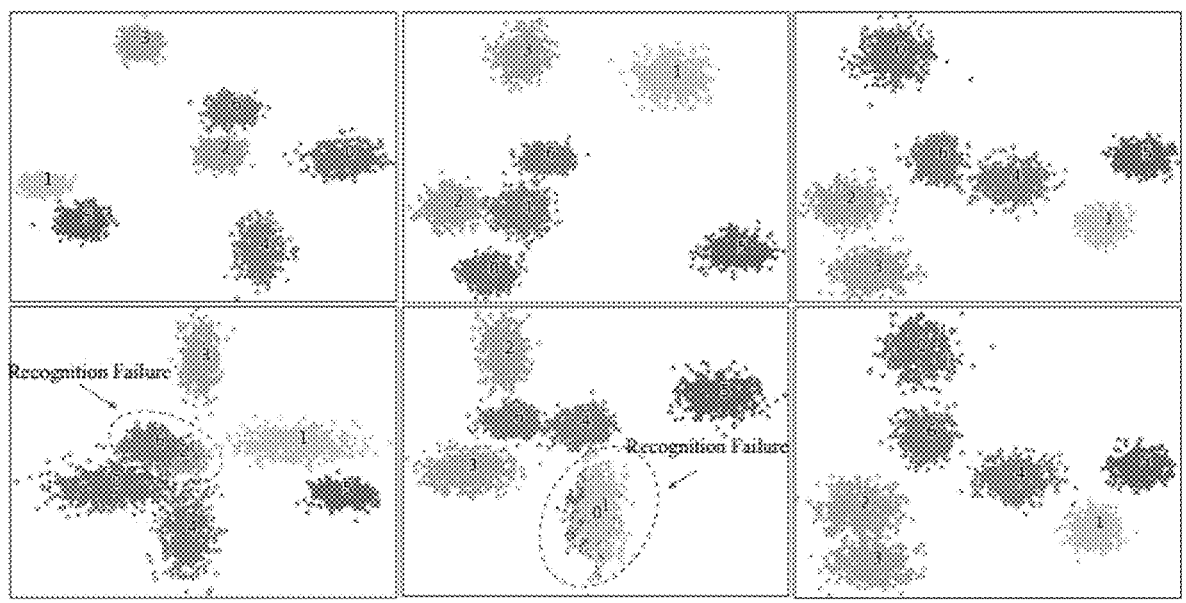
FIG. 7 shows the distributions of learned features in vanilla convolution, gated convolution, and guided gating convolution (non-masked images on the top and masked images on the bottom).

FIG. 3 is a diagram showing comparison among vanilla convolution, gate convolution, and guided gating convolution. FIG. 4 is a diagram showing an architecture for masked face recognition. FIG. 5 shows a synthetic masked dataset. FIGS. 6A-6C show a given image, masked and non-masked regions equally contributed in vanilla convolution, and contributions adaptively adjusted in guided gating convolution, respectively. FIG. 7 shows the distributions of learned features in vanilla convolution, gated convolution, and guided gating convolution (non-masked images on the top and masked images on the bottom), respectively.

Descriptions will be made below with reference to FIGS. 3 to 7.

Vanilla Convolution

As being commonly used in most of deep learning structures for feature extraction, a vanilla convolution can be defined in Equation 1.

$$x_{\ell+1} = \mathcal{F}(x_\ell, W_\ell) = (x_\ell \circledast W_\ell)_{(i,j)} \quad \text{[Equation 1]}$$

$x_\ell$ and $x_{\ell+1}$ denote input and output features at layer $\ell^{th}$, respectively. $\mathcal{F}(x_\ell, W_\ell)$ is a nonlinear transformation function with parameters $W_\ell$, and $\circledast$ represents a convolution operation.

Equation 1 shows that the same filters are applied to all spatial locations (i, j) to generate outputs from vanilla convolutional layers. This is suitable for tasks, such as image classification and object detection, and all pixels of an input image are valid to extract local features in a sliding window fashion.

However, in masked face recognition, inputs may include both regions with valid pixels or features outside holes and invalid pixels or features (in shallow layers) or synthesized pixels (in deep layers) in masked regions. This mathematically causes ambiguity and leads to visual artifacts such as color discrepancy, blurriness, and obvious edge responses in testing.

Gated Convolution

To guarantee a convolution depending only on valid pixels, a gated convolution may minimize effects of masked regions during a learning process.

As shown in FIG. 3, a gated convolution structure includes two main convolution blocks, that is, a feature extraction block and a soft masking block.

While the former (feature extraction block) aims at extracting discriminative features for later operations, the latter (soft masking block) reduces the contributions of features presented in masked regions and guides a learning process to more reliable face regions.

Gated convolution has two advantages. First, the contributions of masked regions are adaptively learned from data through each stage of the learning process. Second, rather than immediately being ignored from the beginning (i.e., hard thresholding), all useful information (e.g., a face shape) from masked regions can still contribute to the discriminative power of the final feature.

Particularly, the gated convolution learns the soft mask score of a gating feature $x_\ell^g$ from the input feature $x_\ell$. The sigmoid function is then used to refine the image feature $x_\ell$ as shown in the Equation 2.

$$x_{\ell+1}^g = \mathcal{F}(x_\ell, W_\ell^g)$$

$$x_{\ell+1} = x_{\ell+1} \times \sigma(x_{\ell+1}^g) \quad \text{[Equation 2]}$$

A gated convolution block provides an effective guidance for the learning process when dealing with masked regions in face images. However, the gated convolution requires a Mask Prior as an input and does not have a supervised mask information at a deeper layer.

Due to a down-sampling resolution at a pooling layer, it is difficult to learn masked regions without supervised mask information.

Guided Gating Convolution

The masked face recognition apparatus and method according to the exemplary embodiments of the present invention may perform a guided gating convolution or block for complementing the above-described other convolutions.

In the following description, the term "GiGaNet" may be used synonymously with the Guided Gating Convolution that the masked face recognition apparatus and method according to the exemplary embodiments of the present invention performs.

First, the availability of a set of masked faces $\mathcal{M} = \{M_i\}_{i=1}^m$ is assumed through identity labels $y = \{Y_i\}_{i=1}^m$. Here, m is the number of samples, pixels of 1 are in a masked region, and pixels of 0 are in a non-masked region.

A synthetic masked face image $\mathcal{I}^M = \{I_j^M\}_{j=1}^n$ is obtained by detecting the mouth and the chin regions in a given face.

In other words, a synthetic masked face image is generated from a mask image $M_i$ and a non-masked image $I_j$ as shown in Equation 3.

$$I_j^M(I_j, M_i) = I_j \times (1 - Y_i) + M_i \times (Y_i) \quad \text{[Equation 3]}$$

The above description is used for learning in a segmentation network or model.

The segmentation network or model may take masked labels and masked features as inputs and learns a softmax score which has a high value as a masked region and a low value as a non-masked region during training. Accordingly, the segmentation model may classify a region as a masked region if the softmax score indicates a high value and classify a region as an un-masked region if the softmax score indicates a low value.

In other words, the segmentation network or model is trained as a model $S(I^M, \theta)$ with a parameter $\theta$ which takes a masked face image $I^M$ as an input and predict or estimate a masked region feature $\hat{x}_{\ell+1}^m = S(I^M, \theta)$ as an output. This can be performed by minimizing a cross entropy (CE) loss function between the estimated masked region feature $\hat{x}_{\ell+1}^m$ and a masked label Y.

$$\mathcal{L}_{CE}(\theta) = \sum_{i=1}^{C} Y_i \log(S(I^M, \theta)) = \sum_{i=1}^{C} Y_i \log(\hat{x}_{\ell+1}^m) \quad \text{[Equation 4]}$$

where C is 2 and denotes the masked and non-masked regions.

The estimated masked region feature $\hat{x}_{\ell+1}^m$ causes the network or model to focus on the non-masked regions and discard occluded features on the masked regions. A guided gating feature is defined by Equation 5.

$$\tilde{x}_{\ell+1} = x_{\ell+1} \times \hat{x}_{\ell+1}^m \quad \text{[Equation 5]}$$

Apart from the gating function of Equation 2, the guided gating feature uses the softmax of the estimated masked regions to refine discriminative face features (or image features) as shown in Equation 5.

A masked region is identified or inferred by optimizing a segmentation network S. Accordingly, no masked label is required during the inference.

Consequently, the guided gating convolution does not require a labeled masked region during face recognition and thus can be efficiently applied to all layers in a deep convolutional neural networks (DCNN). FIG. 3 illustrates a comparison between the Vanilla Convolution, the Gated Convolution, and the Guided Gating Convolution. As the guided gating convolution according to the invention does not require labeled masked regions during the recognition, it can be efficiently applied to any layers in DCNN networks.

Deep Network Architecture for Masked Face Recognition

Considering the above-described guided gating convolution, the masked face recognition apparatus and method according to the exemplary embodiments of the present invention operate as a deep learning-based framework.

Accordingly, the masked face recognition apparatus and method according to the exemplary embodiments of the present invention may be flexibly implemented upon a backbone recognition network such as ResNet-100 or Mobilefacenet (MFN).

Masked face recognition includes two branches, that is, a recognition branch and a segmentation branch.

Recognition Branch or Node

The recognition branch or node includes n down-sampling blocks (e.g., n=4 for MFN). The stack of all blocks for the same resolution is considered as a stage.

A feature at an $\ell^{th}$ layer of a stage s is indicated by $x_{\ell,s}$. s=1 corresponds to the coarsest stage, s=n corresponds to the finest stage.

First, $x_{\ell,s}$ is assumed to be the feature at the $\ell^{th}$ layer of the stage s. For a certain or particular scale level s, an output image feature of the $\ell^{th}$ layer is obtained as in Equation 6.

$$x_{\ell+1,s} = \mathcal{F}(x_\ell, S_\ell) \times W_\ell((\mathcal{F}(x_\ell, W_\ell^m) Y)) = x_{\ell+1,s} \times \hat{x}_{\ell+1}^m \quad \text{[Equation 6]}$$

where $Y^s$ may be the label of a masked region at scale s.

To take advantage of full face information, a decision gating is defined as in Equation 7. This may be performed by the refiner 140.

$$\hat{x}_{\ell+1,s}^d = \begin{cases} \hat{x}_{\ell+1,s}^m, & \text{if } \sum Y \geq 1 \\ 0, & \text{otherwise} \end{cases} \quad \text{[Equation 7]}$$

In other words, the full face (image) features and its refinement are identical for non-masked faces. Here, it is assumed that the mask classification is good enough for decision gating in the inference.

Finally, the image or face feature refined from Equation 6 is reformulated as in Equation 8.

$$x_{\ell+1,s} = x_{\ell+1,s} \times \hat{x}_{\ell+1,s}^d \quad \text{[Equation 8]}$$

Segmentation Branch or Node

The segmentation branch aims to estimate the masked region feature $\hat{x}_{\ell+1}^m$ to refine the image feature $x_{\ell,s}$ at the stage s. For the particular scale level s, a masked label Y is down-sampled to $Y^s$, and masked segmentation is performed on a pixel-level scale.

The image feature $x_{\ell,s}$ at the layer $\ell$ and the scale s is fed into a convolution with a weight $W_\ell^m$ to obtain the masked feature $\hat{x}_{\ell+1,s}^m = \mathcal{F}(x_{\ell}, W_\ell^m)$. The masked feature is fed to a 1×1 convolution to classify regions into two types, that is, masked regions and non-masked regions.

The cross entropy loss is defined as in Equation 4 to minimize the two types of classified regions and labeled masked regions.

According to the exemplary embodiment of the present invention, the above-described learning may relate to a multi-stage mask estimation in which an output mask map is used to allow the network to learn a valid feature in each scale. In other words, the segmentation model may be trained in advance, and an estimated masked region and feature are obtained by feeding the image feature through the segmentation model. Consequently, no label is required for a masked region.

Jointly Training Recognition and Segmentation Branch

The recognition branch and the segmentation branch are jointly trained to find an optimal solution. In other words, image features at different stages are segmented into softmax masked scores from coarse features (shallow layers) to finer features (deep layers). Finally, the objective function of the network in the masked face recognition apparatus and method according to the exemplary embodiments of the present invention is defined as in Equation 9.

$$\mathcal{L}_{total}(\theta) = \mathcal{L}_{recog}(\theta) + \sum_{i=1}^{s} \alpha_i \mathcal{L}_{CE}^s(\theta) \quad \text{[Equation 9]}$$

where $\alpha_i$ denotes a weight for controlling the importance of guided gating convolution of different layers. $\mathcal{L}_{recog}(\theta)$ denotes an arcface loss.

Experimental Results

Datasets

The face recognition method and apparatus according to the exemplary embodiments of the present invention is extensively evaluated on both real and synthetic masked faces of several popular benchmarks including labeled faces in the wild (LFW), celebrities in frontal-profile in the wild (CFP-FP), AgeDB, and MegaFace.

The proposed masked face recognition apparatus and method are additionally evaluated on real masked faces of a newly collected in-house masked face dataset.

Synthetic Masked Datasets: To expand the volume and diversity of masked face recognition on public large-scale face datasets, masks are argumentatively worn on full faces on the basis of extracted 68 landmark points. FIG. 5 shows non-masked face images (first row) and synthetic masked face images (the second row).

In-house masked face dataset: The in-house masked face dataset includes 4133 images of 600 people wearing masks, and 3533 images of the same subjects without masks. Various face variations in pose, illumination, and expression are included in the in-house masked face dataset.

MegaFace: The gallery set of MegaFace includes one million images of 690,000 subjects, and the probe set includes 100,000 photos of 530 unique individuals in FaceeScrub.

Implementation Details

Input faces are cropped and resized to a size of 112×112 pixels with five landmark points. Mobilefacenet and ResNet-100 are adopted in an embedding network. The experiments implement MxNet, an open-source deep learning software framework, used to train, and deploy deep neural networks. The models are trained on four NVIDIA DGX 48 GB graphics processing units (GPUs). The models are trained with the stochastic gradient descent (SGD) algorithm with a weight decay of $5e^{-4}$ and a momentum of 0.9. The learning rate starts from 0.1 epochs, becomes 10, 20, and 30 epochs, and ends at 35 epochs. For arcface loss, a common setting is applied, namely scale is set to 64 and margin is set to 0.5. After the network is trained with softmax loss for 15 epochs, the segmentation branch or node is fixed, and the recognition branch is trained with arcface loss for 20 epochs.

Ablation Studies

Guided Gating Convolution versus Vanilla Convolution: In masked face recognition, inputs include both regions with valid pixels and invalid pixels (i.e., un-masked region and masked region, respectively).

Far apart from vanilla convolution, guided gating convolution causes a matching network to only learn valid pixels by learning to highlight a masked region.

FIGS. 6B and 6C illustrate the features of mobilefacenet at the second stage (s=2) with and without using guided gating convolution from original masked face image in FIG. 6A.

The vanilla convolution treats all pixels equally in both masked regions and non-masked regions, thus resulting in feature maps shown in FIG. 6B.

Guided gating convolution causes a network to learn pixels in non-masked regions using a softmax score. Accordingly, feature maps of guided gating convolution in masked regions tend to have a value of 0 as shown in FIG. 6C.

Guided Gating Convolution versus Gating Convolution: The guided gating convolution according to the invention employs a softmax of an estimated masked region to refine image features. Since a masked region is estimated by optimizing the segmentation network S, a network does not require any masked label during inference. However, gated convolution requires an accurate masked region for both training and inference times.

FIG. 7 illustrates a comparison of distribution of learned fully connected features among different kinds of convolutions: vanilla, gating and guided gating convolutions respectively from left to right. FIG. 7 shows that the all convolutions are able to distinguish between classes in the case of un-masked faces (in the first row). However, the existing convolutions mis-classify between classes in the case of masked face, i.e between the 2nd and the 6th classes for vanilla convolution and class 0th and 1rd in gating convolution. Meanwhile, the method according to the invention (i.e., guided gating convolution) enables the clusters to form together in more easily distinguishable groups in the case of masked face images (in the second row).

Quantitative Results

The first experiment compares the face recognition results of the network according to the invention against state-of-the-art methods in both synthetic and real masked datasets. For LFW, CFP-FP, and AGE-30, the experience uses one image per subject with unmasked face to form the gallery set, and another image per subject with masked face to form probe set. Table 1 shows the accuracy of the network according to the invention against state-of-the-art methods on both synthetic masked face and unmasked face datasets (m denotes masked face). The high accuracies obtained on the both datasets with and without facial mask of the network according to the invention show that guided gating convolution enables the network to identify the useful information for face recognition.

TABLE 1

| Method | Protocol | LFW | mLFW | CFP-FP | mCFP-FP | Age-30 | mAge-30 | Avg. |
|---|---|---|---|---|---|---|---|---|
| MFNv2-Arcface | Small | 99.60 | 97.38 | 95.86 | 81.01 | 97.42 | 88.52 | 93.29 |
| ShuffleFaceNet | Small | 99.62 | — | 97.56 | — | 97.28 | — | — |
| MobileNet | Small | 99.73 | 96.82 | 95.16 | 80.53 | 96.75 | 86.65 | 92.61 |
| Gating Conv | Small | 99.67 | 97.15 | 95.63 | 80.61 | 97.15 | 89.33 | 93.25 |
| GiGaNet | Small | 99.52 | 98.55 | 94.90 | 86.04 | 96.72 | 91.78 | 94.85 |
| R100_Arcface | Large | 99.77 | 98.80 | 98.27 | 88.90 | 98.25 | 93.88 | 96.31 |
| PDSN | Large | 99.20 | — | — | — | — | — | — |
| Deng | Large | 99.60 | — | 94.05 | — | — | — | — |
| DRGAN | Large | — | — | 93.41 | — | — | — | — |
| Dream | Large | — | — | 93.98 | — | — | — | — |
| CurricularFace | Large | 99.80 | 98.5 | 98.42 | 89.60 | 98.34 | 92.66 | 96.22 |
| Gating Conv | Large | 99.65 | 99.40 | 97.47 | 93.67 | 97.57 | 96.23 | 97.52 |
| GiGaNet | Large | 99.70 | 99.40 | 97.10 | 94.11 | 97.45 | 96.08 | 97.30 |

In order to verify the network according to the invention on large-scale dataset, the experiment synthesizes the masked Facescrub dataset. The masked image includes more than 120 different types of mask. The results on this synthesized masked Facescrub dataset are given in the Table 2. Not surprisingly, a similar performance dropping on the original Facescrub probe set is observed for the both arcface and PDSN models. Compared to the baseline model (PDSN), the network according to the invention is superior on the occluded probe set without compromising the performance on the original probe set.

TABLE 2

| Method | Protocol | #FLOP ↓ | Megaface | mMegaface | In-house dataset |
|---|---|---|---|---|---|
| MFNv2-Arcface | Small | 0.933 G | 95.05 | 47.99 | 94.67 |
| ShuffleFaceNet | Small | 1.05 G | 77.4 | — | — |
| MobileNet | Small | — | 91.3 | — | — |
| SphereFace | Small | — | 72.73 | — | — |
| CosFace | Small | — | 77.11 | — | — |
| GiGaNet | Small | 0.937 G | 94.36 | 83.53 | 96.67 |

TABLE 2-continued

| Method | Protocol | #FLOP ↓ | Accuracy ↑ | | |
| --- | --- | --- | --- | --- | --- |
| | | | Megaface | mMegaface | In-house dataset |
| R100_Arcface | Large | 24.5 G | 98.35 | 81.94 | 96.67 |
| PDSN | Large | — | 74.40 | 56.34 | — |
| CurricularFace | Large | 24.5 G | 97.95 | 78.57 | 96.83 |
| GiGaNet | Large | 24.9 G | 97.56 | 90.90 | 97.50 |

According to an exemplary embodiment of the present invention, it is possible to implement a masked face recognition apparatus and method in which a convolution is performed without a masked label.

According to an exemplary embodiment of the present invention, it is possible to implement a masked face recognition apparatus and method which are focused on an important facial region, that is, a non-masked region, when recognizing a face.

According to an exemplary embodiment of the present invention, it is possible to implement a masked face recognition apparatus and method in which a function of identifying a masked region is automatically performed so that high face recognition performance is provided.

According to an exemplary embodiment of the present invention, it is possible to implement a masked face recognition apparatus and method which show improved performance in both non-masked faces and masked faces with qualitative and quantitative results even when evaluated on synthetic masked face datasets, real masked face datasets, and standard large-scale face datasets.

Various advantages and effects of the present invention are not limited to those described above and may be easily understood in the detailed description of embodiments of the present invention.

The term "unit" used in the exemplary embodiment of the present invention means software or a hardware component, such as a field-programmable gate array (FPGA) or application-specific integrated circuit (ASIC), and a "unit" performs a specific role. However, a "unit" is not limited to software or hardware. A "unit" may be configured to be present in an addressable storage medium and also may be configured to run one or more processors. Therefore, as an example, a "unit" includes elements, such as software elements, object-oriented software elements, class elements, and task elements, processes, functions, attributes, procedures, subroutines, segments of program code, drivers, firmware, microcode, circuits, data, a database, data structures, tables, arrays, and variables. Elements and functions provided in "units" may be coupled to a smaller number of elements and "units" or may be subdivided into a greater number of elements and "units." In addition, elements and "units" may be implemented to run one or more central processing units (CPUs) in a device or a secure multimedia card.

All or at least some of elements of the above-described device may be implemented in the form of a hardware module, a software module, or a combination of the hardware module and the software module. The software module may be understood as, for example, an instruction executed by a processor for controlling computation in the device, and the instruction may have a form installed in a memory in the device.

A device and method according to exemplary embodiments of the present invention may be implemented in the form of a program instruction that can be performed through various computing means and may be recorded in a computer-readable recording medium. The computer-readable recording medium may include a program instruction, a data file, a data structure, etc. separately or in combination. The program instruction recorded in the medium may be specially designed and constructed for the present invention or may be well known to and used by those of ordinary skill in the art of computer software. Examples of the computer-readable recording medium include magnetic media such as a hard disk, a floppy disk, and a magnetic tape, optical media such as a compact disc (CD)-read only memory (ROM) and a digital versatile disc (DVD), magneto-optical media such as a floptical disk, and hardware devices, such as a ROM, a random access memory (RAM), and a flash memory, specially configured to store and execute a program instruction. Examples of the program instruction include not only machine language code generated by a compiler but also high-level language code executable by a computer through an interpreter and the like. The aforementioned hardware device may be configured to operate as one or more software modules in order to perform an operation of the present invention, and vice versa.

Although the present invention has been described above with exemplary embodiments, those of ordinary skill in the art should understand that various modifications and changes can be made from the above description without departing from the spirit and scope of the present invention as defined in the following claims.

What is claimed is:

1. A face recognition method comprising:
acquiring a masked face image including a masked region and an un-masked region;
obtaining an image feature from the masked face image;
inputting the image feature to a pre-trained segmentation model to automatically estimate a feature of the masked region; and
refining the image feature using the estimated feature of the masked region,
wherein the refining step comprises focusing on a feature of the un-masked region and discarding the estimated feature of the masked region, and
wherein the segmentation model is trained by using a masked label and a masked feature as the inputs and learning a softmax score to classify a region as a masked region if the softmax score indicates a high value and classify a region as an un-masked region if the softmax score indicates a low value.

2. The face recognition method of claim 1, further comprising minimizing a cross entropy loss function between an estimated feature of the masked region and the masked label.

3. The face recognition method of claim 1, wherein the masked face image is selected from the group consisting of a masked face image and a non-masked face image.

4. The face recognition method of claim 1, wherein the face recognition method is based on a deep convolutional neural network and the face recognition method is performed on a plurality of layers of the deep convolutional neural network.

5. The face recognition method of claim 4, wherein the image feature is down-sampled from a coarsest stage to a finest stage on the plurality of layers.

6. The face recognition method of claim 5, wherein the masked label is down-sampled.

7. A non-transitory computer readable medium containing a program for executing the face recognition method of claim 1.

* * * * *